US012640475B2

(12) United States Patent
Nasimuddin et al.

(10) Patent No.: US 12,640,475 B2
(45) Date of Patent: May 26, 2026

(54) ANTENNA SYSTEM AND A METHOD OF FORMING AN ANTENNA SYSTEM

(71) Applicant: Agency for Science, Technology and Research, Singapore (SG)

(72) Inventors: Nasimuddin, Singapore (SG); Xianming Qing, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 69 days.

(21) Appl. No.: 18/849,060

(22) PCT Filed: Mar. 17, 2023

(86) PCT No.: PCT/SG2023/050176
§ 371 (c)(1),
(2) Date: Sep. 20, 2024

(87) PCT Pub. No.: WO2023/182934
PCT Pub. Date: Sep. 28, 2023

(65) Prior Publication Data

US 2025/0202126 A1 Jun. 19, 2025

(30) Foreign Application Priority Data

Mar. 24, 2022 (SG) ............................ 10202203072S

(51) Int. Cl.
*H01Q 3/46* (2006.01)
*H01Q 3/26* (2006.01)
(Continued)

(52) U.S. Cl.
CPC ............. *H01Q 3/46* (2013.01); *H01Q 3/2605* (2013.01); *H01Q 15/0006* (2013.01); *H01Q 21/29* (2013.01)

(58) Field of Classification Search
CPC ................... H01Q 3/46; H01Q 3/2605; H01Q 15/00–0093
See application file for complete search history.

(56) References Cited

U.S. PATENT DOCUMENTS 10,509,297 B2 * 12/2019 Kafaie Shirmanesh .. G02F 1/29
10,854,970 B2 * 12/2020 Gölden .................... H01Q 1/38
(Continued)

FOREIGN PATENT DOCUMENTS

CN 105552535 A 5/2016
CN 113688972 A * 11/2021 ............. G06N 3/044
(Continued)

OTHER PUBLICATIONS

International Search Report and Written Opinion for PCT/SG2023/050176 mailed Oct. 16, 2023, 9 pages.
(Continued)

*Primary Examiner* — Ab Salam Alkassim, Jr.
(74) *Attorney, Agent, or Firm* — Kilpatrick Townsend & Stockton LLP

(57) ABSTRACT

There is provided an antenna system and a method of forming an antenna system, the antenna system comprising, a base member having a cavity defined on a surface thereof; a tunable material layer disposed within the cavity of the base member; a substantially planar substrate coupled to the base member such that a first side of the substrate is in contact with the tunable material layer; and a radiator coupled to a second side of the substrate such that the substrate is between the radiator and the base member, said radiator comprising an array of grid cells configured to generate a beam upon excitation thereof; wherein the tunable material layer comprises a tunable material capable of changing its dielectric constant in response to a variable biasing voltage applied between the radiator and the base member, such that one or more properties of the beam
(Continued)

changes according to the dielectric constant of the tunable material.

20 Claims, 11 Drawing Sheets

(51) Int. Cl.
*H01Q 15/00* (2006.01)
*H01Q 21/29* (2006.01)

(56) References Cited

U.S. PATENT DOCUMENTS 11,152,714 B2 * 10/2021 Jakoby ........ H01Q 21/061
11,476,555 B1 * 10/2022 Roper ........ G02F 1/19
11,962,078 B2 * 4/2024 Tsai ........ H01Q 21/061
12,308,527 B2 * 5/2025 Wang ........ H01Q 21/0075
2004/0095288 A1 * 5/2004 Jackson ........ H01Q 21/061 343/893
2004/0227668 A1 * 11/2004 Sievenpiper ....... H01Q 15/0066 343/909
2013/0069848 A1 * 3/2013 Toyao ........ H01Q 13/28 343/907
2014/0266897 A1 * 9/2014 Jakoby ........ H01Q 3/44 29/601
2015/0109178 A1 * 4/2015 Hyde ........ H01Q 13/28 343/772
2017/0324148 A1 * 11/2017 Stevenson ........ H02S 30/20
2018/0323514 A1 * 11/2018 Pance ........ H01Q 21/061
2019/0049788 A1 * 2/2019 Kuznetsov ........ G09G 3/36
2019/0326682 A1 * 10/2019 Qin ........ H01Q 1/48
2020/0028254 A1 * 1/2020 Foo ........ H01Q 13/20
2020/0044338 A1 * 2/2020 Haziza ........ H01Q 21/22
2020/0144718 A1 * 5/2020 Gölden ........ H01Q 3/44
2020/0358205 A1 * 11/2020 Sun ........ H01Q 1/48
2021/0135374 A1 * 5/2021 Tsai ........ H01Q 21/0006
2021/0167486 A1 * 6/2021 Xu ........ H01Q 1/38
2021/0249779 A1 * 8/2021 Eylander ........ H01Q 21/24
2021/0272596 A1 * 9/2021 Kuznetsov ........ G02F 1/0147
2022/0094056 A1 * 3/2022 Yang ........ H01Q 9/0457
2022/0252945 A1 * 8/2022 Xu ........ G02F 1/134309
2022/0337240 A1 * 10/2022 Venkatesh ........ H03H 1/00
2023/0028486 A1 * 1/2023 Mehmood ........ H01Q 13/206
2023/0028570 A1 * 1/2023 Mehmood ........ H01Q 3/36
2023/0052527 A1 * 2/2023 Jia ........ H01Q 3/36
2024/0030618 A1 * 1/2024 Oh ........ H01Q 1/50
2024/0204405 A1 * 6/2024 Sleasman ........ H01Q 3/46
2025/0149800 A1 * 5/2025 Suzuki ........ G02F 1/13439
2025/0167438 A1 * 5/2025 Taguchi ........ H01Q 15/0013
2025/0226584 A1 * 7/2025 Fang ........ H01Q 1/48

FOREIGN PATENT DOCUMENTS

CN 114006169 A * 2/2022 ........ H01Q 3/30
WO WO-2022211035 A1 * 10/2022 ........ H01Q 15/148

OTHER PUBLICATIONS

Ismail et al., Phase Agile Reflectarray Cells Based on Liquid Crystals, IET Microwaves, Antennas Propagation, Aug. 31, 2007, vol. 1, No. 4, pp. 809-814.
Karabey et al., A 2-D Electronically Steered Phased-Array Antenna with 2x2 Elements in LC Display Technology, IEEE Transactions on Microwave Theory and Techniques, May 30, 2012, vol. 60, No. 5, pp. 1297-1306.
Encinar et al., Three-Layer Printed Reflectarrays for Contoured Beam Space Applications, IEEE Transactions on Antennas and Propagation, May 31, 2004, vol. 52, No. 5, pp. 1138-1148.

* cited by examiner 28.5 GHz 29.0 GHz 29.5 GHz 30.0 GHz 28.5 GHz 29.0 GHz 29.5 GHz 30.0 GHz

ANTENNA SYSTEM AND A METHOD OF FORMING AN ANTENNA SYSTEM

CROSS-REFERENCE TO RELATED APPLICATIONS

This application is a 371 National Stage filing of PCT Application No. PCT/SG2023/050176, filed Mar. 17, 2023, which claims priority to SG Patent Application No. 10202203072S, filed Mar. 24, 2022, which are incorporated by reference herein in their entirety.

TECHNICAL FIELD

The present disclosure relates broadly to an antenna system and a method of forming an antenna system.

BACKGROUND

Millimeter-wave (mmW) wireless communication systems are widely investigated due to their wide spectrum to provide relatively high data rate for point-to-point and point-to-multipoint systems. Antennas/Arrays with scanning beam or steering beam or switched beam are useful for applications such as 5G, 77 GHz Automotive Radar, K/Ka-band satellite communication systems, K/Ka-band airborne communication systems. There exists a variety of applications for steering beam or switched beam antenna systems, such as 5G communication/connectivity, smart car radar, imaging system, airborne applications, high speed vehicles, ships, trains, etc. As such, relatively low-cost, low-profile beam steering/beam scanning/beam switchable antenna systems with low power consumption are attractive and in demand in recent years.

In beam scanning/beam steering/beam switchable antenna technologies for wireless communication, radar, and detection/imaging systems, electronic beam scanning/steering systems/beam switchable are typically more advanced over mechanical or hybrid beam steering solutions in terms of its scan speed, size, and weight advantages. However, in current electronic beam steering technologies, there are still concerns over cost and power consumption for conventional digital beamforming or analog/hybrid beamforming or phased array solutions.

In general, the conventional digital beamforming solution requires relatively more sub arrays to achieve high resolution while having an analog-to-digital converter (ADC)/digital-to-analog converter (DAC) on every channel. This leads to relatively high power consumption and increased cost.

Similarly, the conventional phased array system typically requires expensive solid-state, microelectromechanical systems (MEMS) or ferrite-based phase shifters, as well as many control lines and power distribution network. This leads to high cost, high power consumption and high complexity, especially when the number of elements increases for high gain requirements to compensate for high path loss at the mmW band. In phased array solutions, it is still difficult to achieve a low-cost beam steering solution by reducing the number of phase shifters at millimeter-wave, as high gain is required to compensate for the high path loss and to establish a reliable communication link.

In hybrid radiofrequency (RF)/digital beamforming technologies, the systems are still complex and involves relatively high cost, and high-power consumption. The conventional switched beam steering solution is simple, low cost, and low-power consumption but with limited number of beams with non-continuous scanning and limited scanning resolution.

Thus, there is a need for an antenna system and a method of forming an antenna system which seek to address or at least ameliorate one of the above problems.

SUMMARY

In accordance with a first aspect of the present disclosure, there is provided an antenna system comprising, a base member having a cavity defined on a surface thereof; a tunable material layer disposed within the cavity of the base member; a substantially planar substrate coupled to the base member such that a first side of the substrate is in contact with the tunable material layer; and a radiator coupled to a second side of the substrate such that the substrate is between the radiator and the base member, said radiator comprising an array of grid cells configured to generate a beam upon excitation thereof; wherein the tunable material layer comprises a tunable material capable of changing its dielectric constant in response to a variable biasing voltage applied between the radiator and the base member, such that one or more properties of the beam changes according to the dielectric constant of the tunable material.

The radiator may further comprise a plurality of feeding points, wherein each feeding point of the plurality of feeding points is configured to receive an excitation signal for generating the beam.

The plurality of feeding points may be arranged to be equally spaced apart along a first direction which is parallel to the substrate.

The plurality of feeding points may be arranged in a lattice configuration having a first direction and a second direction, wherein the second direction is substantially perpendicular to the first direction.

The base member may be made of metal and the tunable material layer may be a liquid crystal layer.

The antenna system may further comprise a processing module configured to provide the biasing voltage.

The dielectric constant of the tunable material may be configured to vary from 2.4 to 3.4 in response to the biasing voltage.

The biasing voltage may be configured to vary from 0 V to 20 V.

The cavity may have a depth falling in the range of from 0.2 mm to 0.5 mm at the Ka-band.

The one or more properties of the beam may comprise a steering angle of the beam and a steering resolution of the beam.

The steering angle of the beam may be configured to range from −28° to 28° with respect to a vertical axis which is perpendicular to the substantially planar substrate.

The antenna system may be substantially devoid of a phase shifter.

In accordance with a second aspect of the present disclosure, there is provided a method of forming an antenna system, the method comprising, providing a base member having a cavity defined on a surface thereof; disposing a tunable material layer within the cavity of the base member; coupling a substantially planar substrate to the base member such that a first side of the substrate is in contact with the tunable material layer; and coupling a radiator to a second side of the substrate such that the substrate is between the radiator and the base member, the radiator configured to generate a beam upon excitation thereof; wherein the tunable material layer comprises a tunable material capable of changing its dielectric constant in response to a variable biasing voltage applied between the radiator and the base member, such that one or more properties of the beam changes according to the dielectric constant of the tunable material.

The method may further comprise providing a plurality of feeding points to the radiator, wherein each feeding point of the plurality of feeding points is configured to receive an excitation signal for generating the beam.

The method may further comprise arranging the plurality of feeding points to be equally spaced apart along a first direction which is parallel to the substrate.

The method may further comprise arranging the plurality of feeding points in a lattice configuration having a first direction and a second direction, wherein the second direction is substantially perpendicular to the first direction.

The base member may be made of metal and the tunable material layer may be a liquid crystal layer.

The method may further comprise providing a processing module configured to provide the biasing voltage.

The antenna system may be substantially devoid of a phase shifter.

In accordance with a third aspect of the present disclosure, there is provided a method of operating an antenna system comprising, a base member having a cavity defined on a surface thereof; a tunable material layer disposed within the cavity of the base member, said tunable material layer comprising a tunable material capable of changing its dielectric constant in response to a variable biasing voltage; a substantially planar substrate coupled to the base member such that a first side of the substrate is in contact with the tunable material layer; and a radiator comprising an array of grid cells coupled to a second side of the substrate such that the substrate is between the radiator and the base member; wherein the method comprises exciting the radiator to generate a beam; and applying a variable biasing voltage between the radiator and the base member to change the dielectric constant of the tunable material, such that one or more properties of the beam changes according to the dielectric constant of the tunable material.

BRIEF DESCRIPTION OF THE DRAWINGS

Exemplary embodiments of the invention will be better understood and readily apparent to one of ordinary skill in the art from the following written description, by way of example only, and in conjunction with the drawings, in which.

DETAILED DESCRIPTION

Example, non-limiting embodiments may provide an antenna system and a method of forming an antenna system.

In various embodiments, the terms "left", "right", "upper", "lower", "top", "bottom" and grammatical variations thereof as used herein are not intended to be limiting and are merely used to orient a reader to the relative position or arrangement of particular components.

Figure 1:
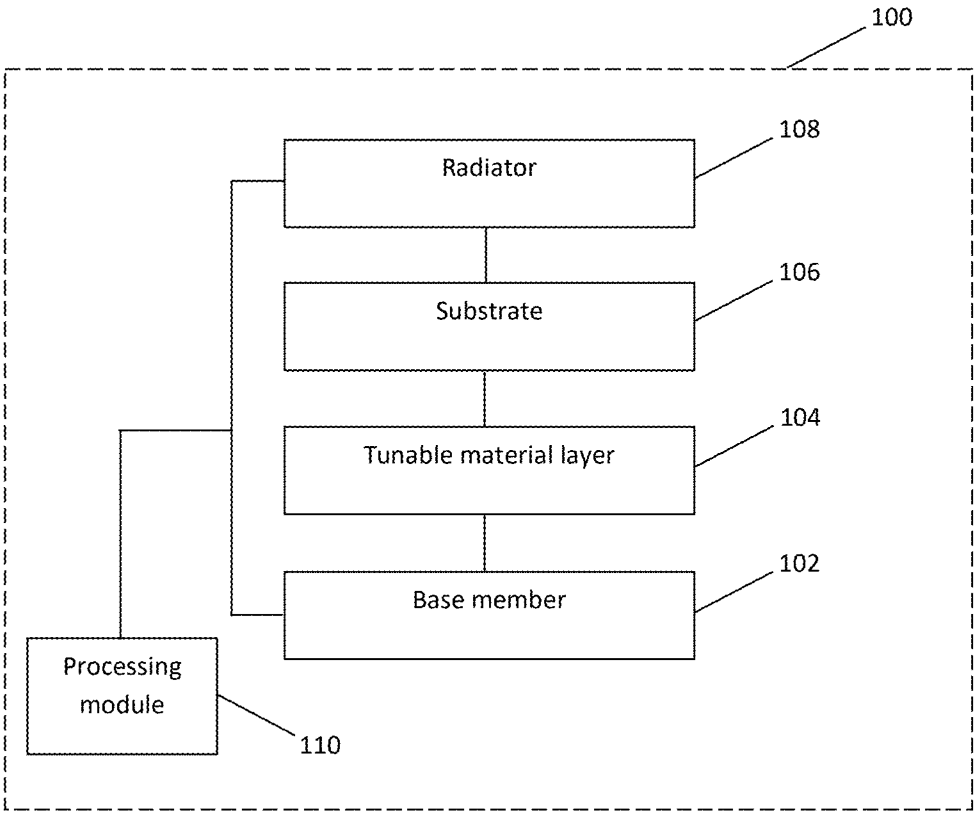
FIG. 1 is a schematic block diagram of an antenna system in an example embodiment.

FIG. 1 is a schematic block diagram of an antenna system (100) in an example embodiment. The antenna system (100) comprises a base member (102) having a cavity/recessed portion defined on a surface thereof, a tunable material layer (104) disposed within the cavity of the base member (102), a substantially planar substrate (106) coupled to the base member (102) such that a first side of the substrate (106) is in contact with the tunable material layer (104), and a radiator (108) coupled to a second side of the substrate (106) such that the substrate (106) is between the radiator (108) and the base member (102), said radiator (108) comprising an array of grid cells configured to generate a beam upon excitation thereof. In the example embodiment, the tunable material layer (104) comprises a tunable material capable of changing its dielectric constant in response to a variable biasing voltage applied between the radiator (108) and the base member (102), such that one or more properties of the beam changes according to the dielectric constant (or relative permittivity) of the tunable material. The antenna system (100) may further comprise a processing module (110) for providing the biasing voltage. The one or more properties of the beam may comprise a steering angle of the beam and a steering resolution of the beam.

In the example embodiment, the base member (102) functions to provide support for the other components of the antenna system (100). The base member (102) may be a ground/grounding plate, i.e., configured to be connected to ground. The base member (102) may be made of conductive material(s), e.g., electrically conductive material(s). The base member (102) may be a metallic base member, i.e., made of metal. Suitable materials for the base member (102) include but are not limited to copper, iron, aluminum, stainless steel, silver, tin, nickel, and graphite. The base member (102) may comprise a plurality of apertures/holes/openings for facilitating electrical connection between a signal source and the radiator (108). For example, each aperture in the base member (102) may be configured to allow a feed line or a feed connector, e.g., coaxial connector, to pass through to couple to the radiator (108).

In the example embodiment, the cavity functions to hold/contain/accommodate the tunable material layer (104). The cavity may be formed on a top surface of the base member (102). The cavity may act as a container for holding the tunable material layer (104). The cavity may be partially or completely sealed by the substrate (106) when the first side of the substrate (106) is coupled to the base member (102).

In the example embodiment, the tunable material layer (104) functions to tune the one or more properties of the beam generated from the radiator (108). The tunable material in the tunable material layer (104) may be in a solid, liquid or gel (semi-solid) state. Suitable materials for making the tunable material layer (104) include but are not limited to perovskite ferroelectric $Ba_{0.6}Sr_{0.4}TiO_3$, barium strontium titanate (BST), bismuth zinc niobate (BZN), $SrTiO_3$, or STO (tunable materials whose dielectric constant are dependent on direct current (DC) bias).

In the example embodiment, the tunable material may be a liquid crystal. The term "liquid crystal" as used herein refers to a substance which flows like a liquid but has some degree of ordering in the arrangement of its molecules. A liquid crystal may be not limited to a particular phase or structure, but a liquid crystal may have a specific resting orientation. The orientation and phases of a liquid crystal may be manipulated by external forces, for example, temperature, magnetism, or electricity, depending on the class of liquid crystal. The tunable material layer (104) may comprise a liquid crystal composition. The liquid crystal composition may comprise a single substance or a mixture of substances. The liquid crystal composition may have/possess a nematic phase. The term "nematic" as used herein refers to liquid crystals in which the long axes of the molecules remain substantially parallel, but the positions of the centers of mass are randomly distributed. The liquid crystal composition may have/possess dielectric constant anisotropy (As) capable of phase control with respect to electromagnetic waves of microwaves or millimeter waves. The tunable material layer (104) may comprise a liquid crystal composition capable of reversibly changing its dielectric constant by reversibly changing an orientation direction of liquid crystal molecules within said liquid crystal composition. The liquid crystal composition may have a dielectric constant anisotropy ($\Delta\varepsilon$) falling in the range of from about 0 to about 1.0. The dielectric constant anisotropy of the liquid crystal composition may fall in a range with start and end points selected from the following group of numbers: 0, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, and 1.0. It will be appreciated that a relatively higher degree of dielectric anisotropy in liquid crystal composition may result in an improved response rate and a lower biasing voltage required. Suitable liquid crystal materials include but are not limited to GT7-29001, GT3-23001, GT5-28004, E7, MDA-03-2844, BL006, etc.

In the example embodiment, the substrate (106) functions to support the radiator (108). The second side of the substrate (106) is opposite of the first side of the substrate (106). The substrate (106) may be a dielectric substrate. The substrate (106) may be a hydrocarbon/ceramics composite substrate, a polytetrafluoroethylene (PTFE)/ceramics composite substrate, a PTFE/woven glass composite substrate, a woven glass reinforced hydrocarbon/ceramic composite substrate, or any other suitable materials.

In the example embodiment, the radiator (108) functions to generate the beam in response to excitation signals received from a signal source. The radiator (108) may further comprise a plurality of feeding points configured to receive the excitation signals. The plurality of feeding points may be arranged in a specific configuration such that the beam generated by the radiator has a specific beam pattern. The antenna system (100) may further comprise a plurality of feed lines or feed connectors, e.g., coaxial connectors, for transmitting and receiving signals to and from the radiator (108). Each of the plurality of feeding points may be coupled to each of the plurality of feed lines or feed connectors.

In the example embodiment, the processing module (110) is configured to provide the variable biasing voltage for varying the dielectric constant of the tunable material layer. The biasing voltage may be a direct DC voltage. In the example embodiment, where the tunable material layer (104) comprises liquid crystal, the DC bias may be applied to the radiator (108) and the metal cavity of the base member (102). The voltage across the radiator layer (108) and metal cavity of the base member (102) alters the orientation of the liquid crystal and therefore changes the dielectric constant of the liquid crystal. In the example embodiment, the biasing voltage may fall in a range of from about 0 V to about 20V. In the example embodiment, the biasing voltage may fall in a range with start and end points selected from the following group of numbers: 0, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, and 20 V. In the example embodiment, the biasing voltage may be varied gradually, in steps, or both gradually and in steps. In the example embodiment, the biasing voltage may be varied in steps of no more than 0.01 V, no more than 0.05 V, no more than 0.1 V, no more than 0.5 V, no more than 1 V, no more than 1.5 V, no more than 2 V, no more than 3 V, no more than 4 V, or no more than 5 V. The processing module (110) may also be configured to control the various components and parameters of the antenna system (100). For example, the processing module (110) may be configured to control the excitation signals provided to the radiator (108).

In the example embodiment, the antenna system (100) may be a tunable grid array antenna (GAA) system, more specifically, a tunable material (e.g., liquid crystal) based GAA system. The antenna system (100) may advantageously provide a cost-effective electronic beam steering solution with relatively high resolution (e.g., less than about) 1° and relatively low power consumption as compared to existing antenna, e.g., phase-array antenna. As compared with conventional GAA systems, the presently disclosed GAA may have a slightly higher power consumption because of the additional DC bias, but this is outweighed by its advantages, such as a significantly enhanced coverage and scan resolution. As compared with other solutions such as phase-array antenna, the presently disclosed GAA is relatively low cost and low power consumption since only switches and DC bias are used.

In the example embodiment, the antenna system (100) may advantageously provide a compact and relatively low-cost planar beam steering antenna system at mmW (i.e., millimeter band) applications without physical phase shifters. The antenna system (100) may advantageously provide a planar GAA based on liquid crystal beam steering solution which may be advantageously capable of generating 3-D switched beams with an enhanced coverage (e.g., about ±20°) and relatively high resolution by changing the biasing voltage.

Compared with the traditional phased array, the antenna system (100) may be capable of providing the necessary phase shift for generating beam scanning without physical phase shifters, which is particularly advantageous for a mmW beam steering antenna. Based on tunable material (e.g., liquid crystal) dielectric constant variation with applied biasing, a phase shift or delay may be created within the antenna system (100) (e.g., GAA) at fixed excitation. In the example embodiment, the tenability of varying the relative permittivity may be facilitated by the tunable material (e.g., liquid crystal) in the antenna system (100), e.g., GAA system. Further, based on the applied biasing voltage, the antenna system (100) may achieve significantly improved beam steering coverage and resolution. Compared with expensive phased array/digital beamforming array with larger power consumption, the antenna system (100), e.g., electronic beam steering tunable material (e.g., liquid crystal) based planar GAA, may provide a simplified configuration with low profile, low cost, and low power consumption.

Figure 2A:
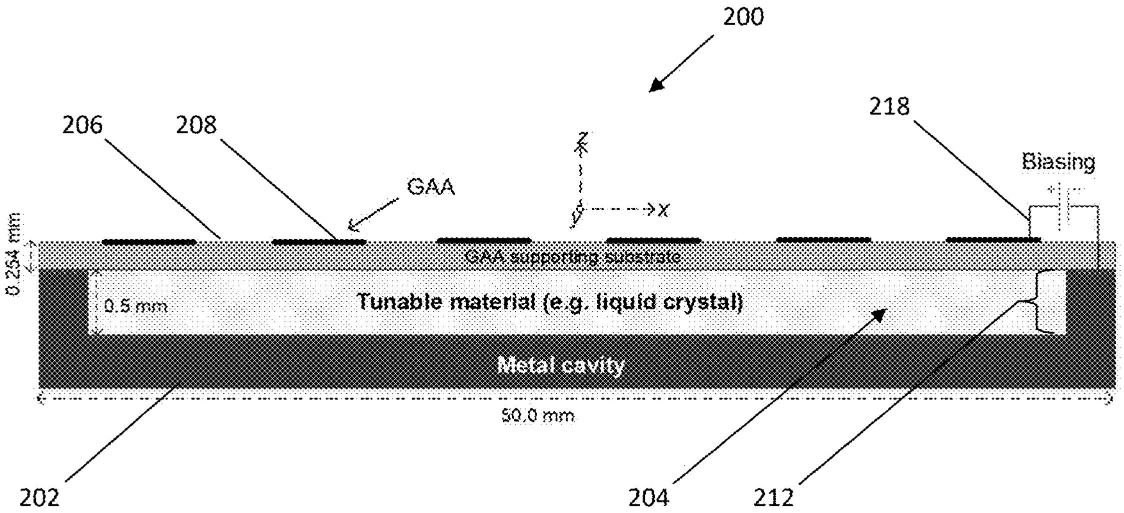
FIG. 2A is a schematic cross sectional view drawing of an antenna system, e.g., grid array antenna in an example embodiment.
Figure 2B:
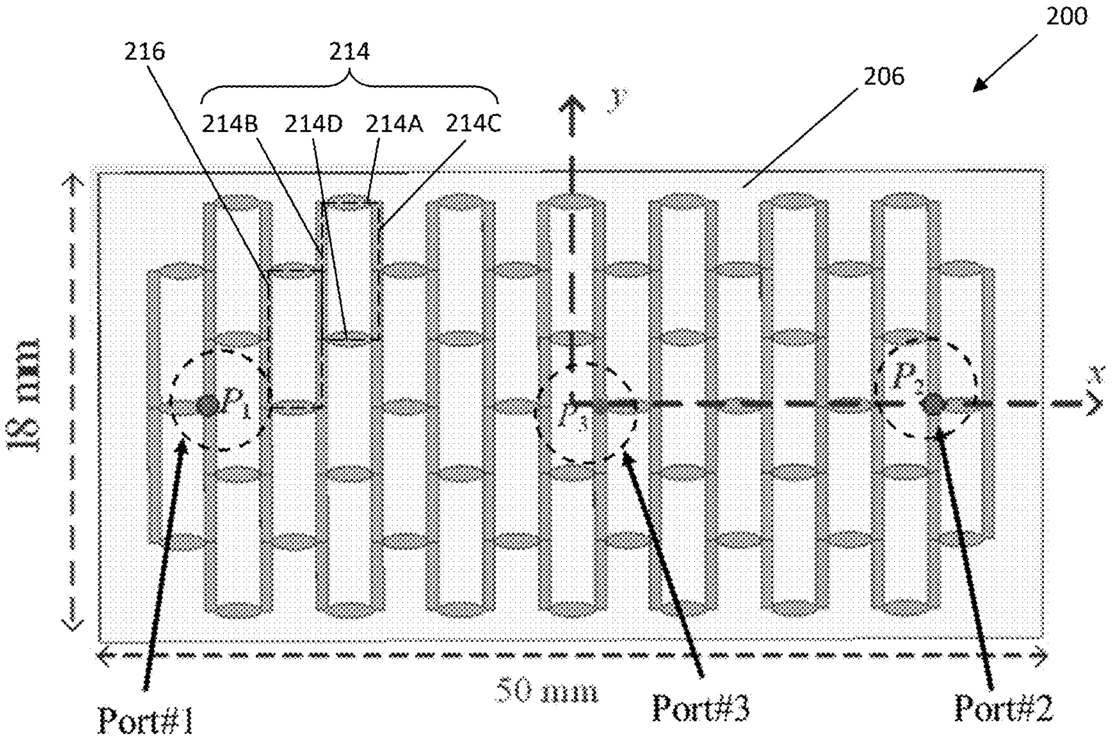
FIG. 2B is a schematic top view drawing of the grid array antenna system in the example embodiment.
Figure 3A:
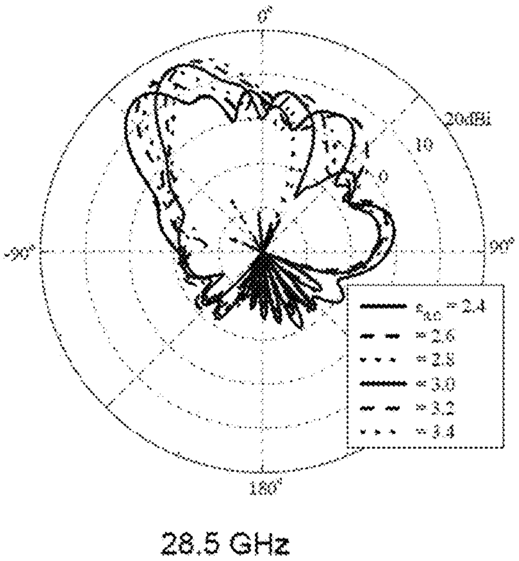
FIG. 3A is a plot showing radiation patterns in the XZ plane produced by port #1 of the grid array antenna at 28.5 GHz in an example embodiment.
Figure 3B:
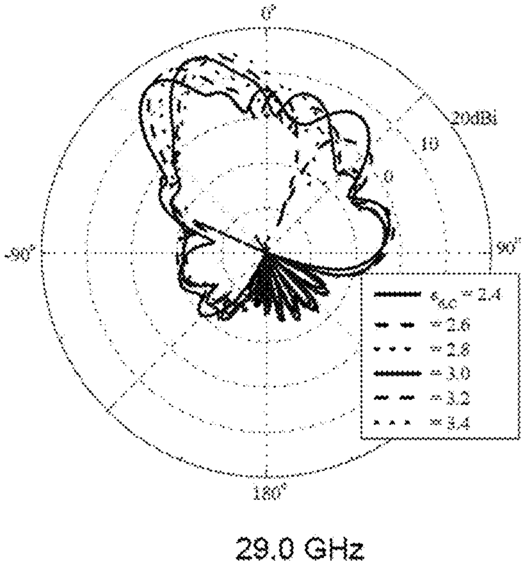
FIG. 3B is a plot showing radiation patterns in the XZ plane produced by port #1 of the grid array antenna at 29.0 GHz in the example embodiment.
Figure 3C:
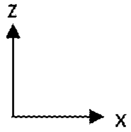
FIG. 3C is a plot showing radiation patterns in the XZ plane produced by port #1 of the grid array antenna at 29.5 GHz in the example embodiment.
Figure 3C:
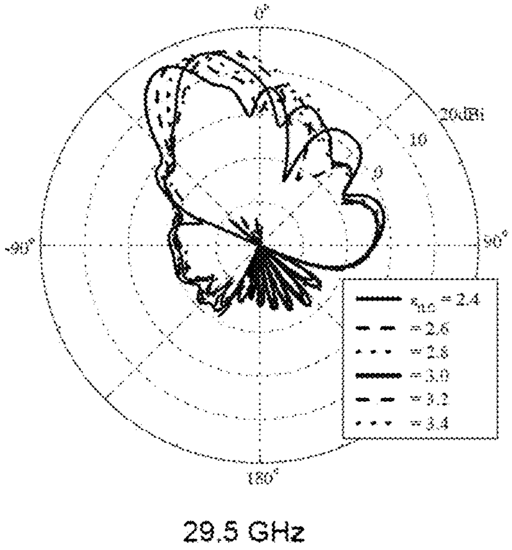
Figure 3D:
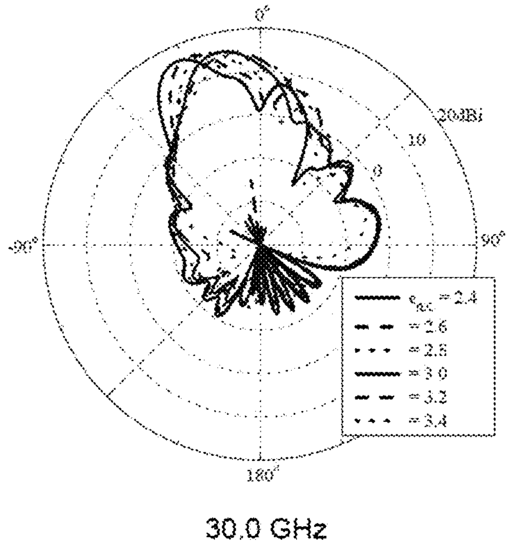
FIG. 3D is a plot showing radiation patterns in the XZ plane produced by port #1 of the grid array antenna at 30.0 GHz in the example embodiment.
Figure 4A:
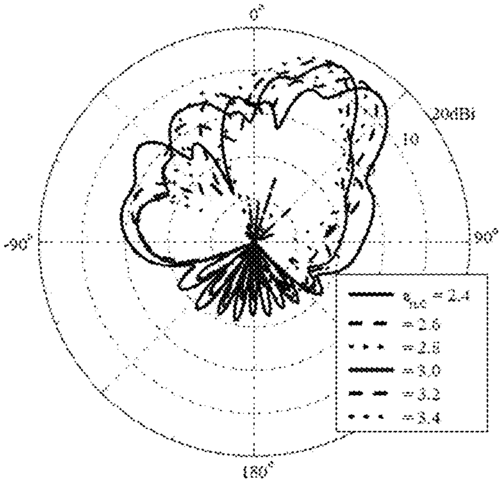
FIG. 4A is a plot showing radiation patterns in the XZ plane produced by port #2 of the grid array antenna at 28.5 GHz in an example embodiment.
Figure 4B:
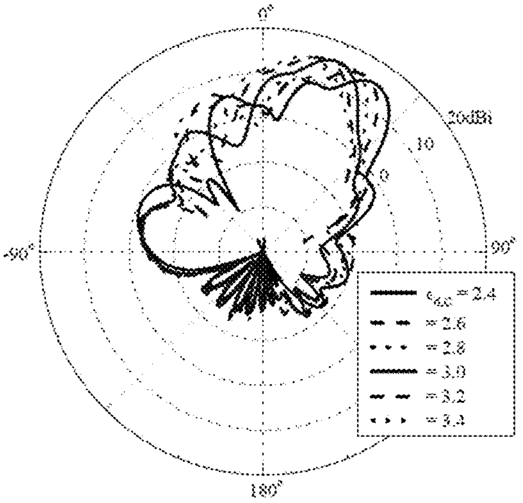
FIG. 4B is a plot showing radiation patterns in the XZ plane produced by port #2 of the grid array antenna at 29.0 GHz in the example embodiment.
Figure 4C:
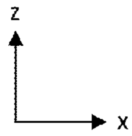
FIG. 4C is a plot showing radiation patterns in the XZ plane produced by port #2 of the grid array antenna at 29.5 GHz in the example embodiment.
Figure 4C:
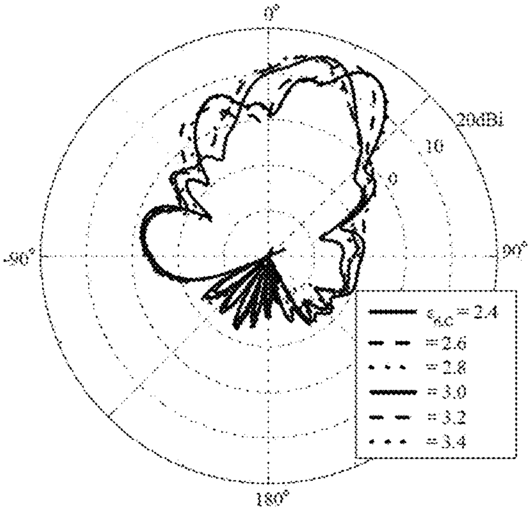
Figure 4D:
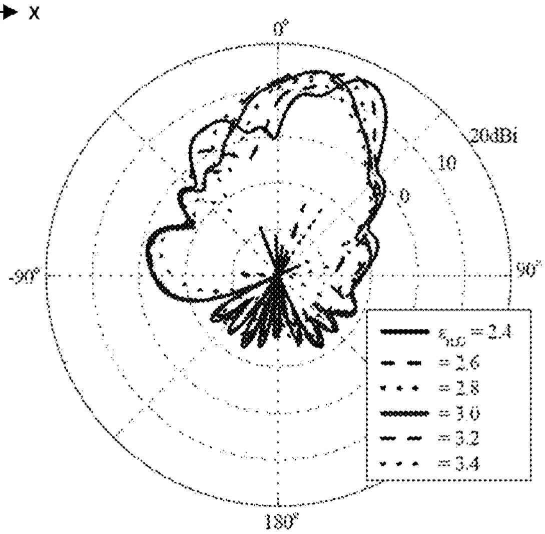
FIG. 4D is a plot showing radiation patterns in the XZ plane produced by port #2 of the grid array antenna at 30.0 GHz in the example embodiment.
Figure 5A:
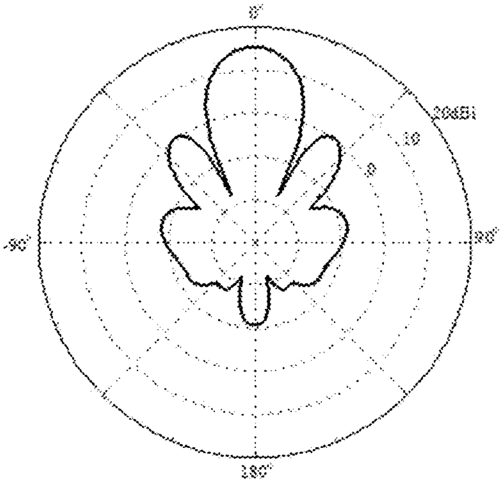
FIG. 5A is a plot showing a radiation pattern in the XZ plane produced by port #3 of the grid array antenna at 28.5 GHz in an example embodiment.
Figure 5B:
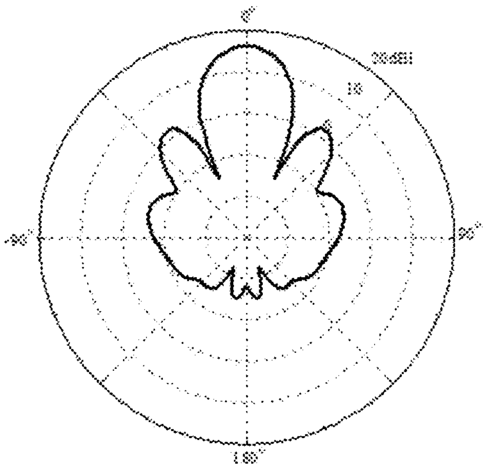
FIG. 5B is a plot showing a radiation pattern in the XZ plane produced by port #3 of the grid array antenna at 29.0 GHz in the example embodiment.
Figure 5C:
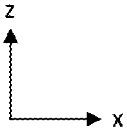
FIG. 5C is a plot showing a radiation pattern in the XZ plane produced by port #3 of the grid array antenna at 29.5 GHz in the example embodiment.
Figure 5C:
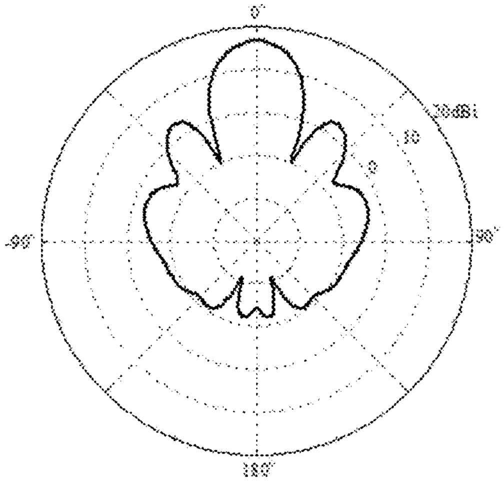
Figure 5D:
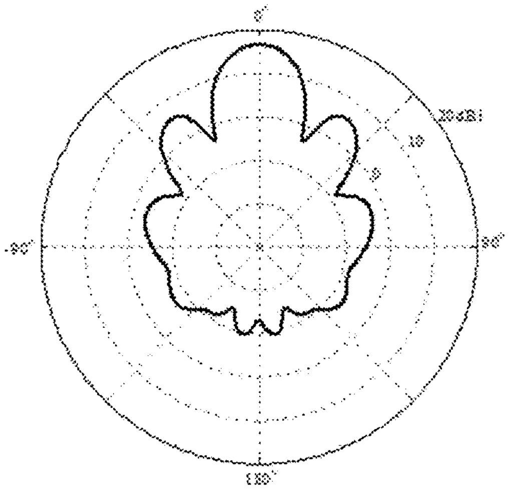
FIG. 5D is a plot showing a radiation pattern in the XZ plane produced by port #3 of the grid array antenna at 30.0 GHz in the example embodiment.

FIG. 2A is a schematic cross sectional view drawing of an antenna system, e.g., grid array antenna (200) in an example embodiment. FIG. 2B is a schematic top view drawing of the grid array antenna system (200) in the example embodiment. The grid array antenna system (200) comprises a base member (202) having a cavity/recessed portion (212) defined on a (top) surface thereof, a tunable material layer (204) disposed within the cavity (212) of the base member (202), a substantially planar substrate (206) coupled to the base member (202) such that a first (bottom) side of the substrate (206) is in contact with the tunable material layer (204), and a radiator (208) coupled to a second (top) side of the substrate (206) such that the substrate (206) is between the radiator (208) and the base member (202), said radiator (208) comprising an array of grid cells (e.g., 214, 216) configured to generate a beam upon excitation thereof. In the example embodiment, the tunable material layer (204) comprises a tunable material capable of changing its dielectric constant in response to a variable biasing voltage (218) applied between the radiator (208) and the base member (202), such that one or more properties of the beam changes according to the dielectric constant of the tunable material.

In the example embodiment, the base member (202) is configured to support the tunable material layer (204), substrate (206), and radiator (208). The base member (202) is a metallic base member, i.e., made of metal.

In the example embodiment, the cavity (212) on the surface of the base member (202) is configured to hold/accommodate the tunable material layer (204). The cavity (212) may be recessed into the material of the base member (202). The cavity (212) may comprise a bottom surface and a lateral surface defined by the base member (202). As shown in FIG. 2A, the cavity (212) has a depth of about 0.5 mm. In the example embodiment, the cavity (212) may have a depth falling in the range of from about 0.2 mm to about 0.5 mm at 30 GHz or at the Ka band. In various embodiments, the cavity depth is directly related to the operating frequency of the antenna system (200). In various embodiments, at the Ka band of from about 27 GHz to about 30 GHz, the corresponding wavelength range is from about 11 mm to about 10 mm. In various embodiments, the cavity/substrate thickness may range from about $0.005\lambda_o$ to about $0.05\lambda_o$ for antenna designs. In various embodiments, the cavity depth may be about $0.025\lambda_o$. $\lambda_o$ is free space wavelength at the operating frequency.

In the example embodiment, the tunable material layer (204) comprises a liquid crystal composition. Some examples of suitable liquid crystal materials include GT7-29001, GT3-23001, GT5-28004, E7, MDA-03-2844, BL006, etc.

In the example embodiment, the radiator (208) comprising the array of grid cells (e.g., 214, 216) may be in the form of a mesh. The radiator (208) may be printed, deposited, or etched onto the substrate (206). As shown in FIG. 2B, the array of grid cells (e.g., 214, 216) of the radiator (208) may be a mesh, e.g., rectangular mesh, of microstrip lines disposed on the substrate (206). The array of grid cells (e.g., 214, 216) of the radiator (208) may be arranged in a rectangular staggered pattern. In other words, the array of grid cells (e.g., 214, 216) may collectively be arranged to have a rectangular pattern. It will be appreciated that the array of grid cells (e.g., 214, 216) is not limited to a rectangular staggered pattern and may be arranged in a circular, parallelogram, square, rhombus, or any other suitable patterns.

Each grid cell (214) of the array of grid cells (e.g., 214, 216) may be a rectangular grid cell, i.e., each grid cell (214) may take the form of a rectangle comprising two long sides and two short sides. Adjacent grid cells (e.g., between 214 and 216) in the array of grid cells may be arranged to be staggered such that the short sides of the rectangular grid cells are arranged to be offset from each other (i.e., not aligned to each other). Each grid cell (214) of the array of grid cells (e.g., 214, 216) may comprise a first electrically conductive bar/strip/line (214A) having a first and second end, a second electrically conductive bar (214B) coupled to the first end of the first electrically conductive bar (214A) and substantially perpendicular to the first electrically conductive bar (214A), a third electrically conductive bar (214C) coupled to the second end of the first electrically conductive bar (214A) and substantially perpendicular to the first electrically conductive bar (214A), and a fourth electrically conductive bar (214D) having a first end coupled to the second electrically conductive bar (214B) and a second end coupled to the third electrically conductive bar (214C). For each grid cell (214), the short sides of the rectangle may comprise at least one radiating element, i.e., the first electrically conductive bar (214A) and/or the fourth electrically conductive bar (214D) may be a radiating element. For each grid cell (214), the long sides of the rectangle may comprise at least one feeding element, i.e., the second electrically conductive bar (214B) and/or the third electrically conductive bar (214C) may be a feeding element. In the array of grid cells, the electrically conductive bar/strip/line of a grid cell (e.g., 214) may be shared with a neighboring grid cell (e.g., 216). For example, the second electrically conductive bar (214B) of the grid cell (214) is shared with the adjacent grid cell (216). The size of each grid cell may be about $\lambda \times \lambda/2$, where $\lambda$ is a guided wavelength at an operating frequency.

The radiator (208) may further comprise a plurality of feeding points/ports. As shown in FIG. 2B, the radiator (208) comprises three feeding ports, namely, a first feeding port (P1), a second feeding port (P2) and a third feeding port (P3). Each feeding port (e.g., P1) of the plurality of feeding ports (P1, P2, P3) is configured to receive an excitation signal for generating the beam. The plurality of feeding ports (P1, P2, P3) are arranged to be equally spaced apart along a first direction which is parallel to or in plane with the substantially planar substrate (206). As shown in FIG. 2B, the three feeding ports are arranged along the x-axis. Each feeding point (e.g., P1) of the plurality of feeding points (P1, P2, P3) is configured to receive an excitation signal for generating the beam.

In the example embodiment, the grid array antenna (200) may further comprise a processing module (compare 110 of FIG. 1) configured to provide the biasing voltage (218) for varying the dielectric constant of the tunable material layer. The processing module may also be configured to control the various components and parameters of the grid array antenna system (200). The processing module may be configured to apply the biasing voltage (218) falling in the range of from about 0 V to about 20 V. The biasing voltage (218), e.g., DC bias, is applied to the radiator (208) and the cavity (212) of metallic base member (202). The voltage across the radiator layer (208) and cavity (212) of the metallic base member (202) alters the orientation of the tunable material layer, e.g., liquid crystal, and therefore changes the dielectric constant of the liquid crystal. The dielectric constant of the tunable material may be configured to vary from about 2.4 to about 3.4 in response to the biasing voltage (218). The variation of the dielectric constant in response to the biasing voltage may fall in a range with start and end points selected from the following group of numbers: 2.4, 2.45, 2.5, 2.55, 2.6, 2.65, 2.7, 2.75, 2.8, 2.85, 2.9, 2.95, 3.0, 3.05, 3.1, 3.15, 3.2, 3.25, 3.3, 3.35, and 3.4. The one or more properties of the beam may comprise a steering angle of the beam and a steering resolution of the beam. The steering angle of the beam may be configured to range from about −28° to about 28° with respect to a vertical axis (i.e., Z-axis) which is perpendicular to the substantially planar substrate (206) (i.e., XY-plane). The steering angle of the beam may be configured to fall in a range with respect to the vertical axis (i.e., Z-axis) which is perpendicular to the substantially planar substrate (206) (i.e., XY-plane), said range having start and end points selected from the following group of numbers: −28°, −27°, −26°, −25°, −24°, −23°, −22°, −21°, −20°, −19°, −18°, −17°, −16°, −15°, −14°, −13°, −12°, −11°, −10°, −9°, −8°, −7°, −6°, −5°, −4°, −3°, −2°, −1°, 0°, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, and 28°. The beam steering resolution of the beam may be configured to fall in the range of from about 0.2° to about 1°. The beam steering resolution of the beam may be configured to fall in a range with start and end points selected from the following group of numbers: 0.2°, 0.3°, 0.4°, 0.5°, 0.6°, 0.7°, 0.8°, 0.9°, and 1° The steering resolution of the beam may be less than about 1°.

In the example embodiment, the grid antenna system (200) has a tunable material-based GAA structure having a length of 50.0 mm and a width of 18.0 mm. The cavity (212), for the tunable material, e.g., liquid crystal, has a depth of 0.5 mm. The substrate (206) is a GAA supporting substrate (Rogers RO4003, dielectric constant, $\varepsilon r$=3.5, loss tangent=0.0027) with a thickness of 0.254 mm (or 10 mil).

In the example embodiment, the grid array antenna system (200) may be implemented as a two-port tunable material-based GAA structure to generate radiation patterns from port #1 to port #3. In the two-port tunable material-based GAA structure, the liquid crystal dielectric constant may be varied at ports #1 and #2 to generate a beam with enhanced coverage towards the left and right side (i.e., negative X-axis and positive X-axis planes) while port #3 may be used to generate a beam at the boresight (i.e., the direction of peak/maximum gain of the antenna).

FIG. 3A to FIG. 3D are plots showing radiation patterns generated at port #1 with variations of liquid crystal dielectric constant with beam scanning in the XZ plane at 28.5 GHz, 29.0 GHz, 29.5 GHz and 30 GHz, respectively. FIG. 4A to FIG. 4D are plots showing radiation patterns generated at port #2 with variations of liquid crystal dielectric constant with beam scanning in the XZ plane at 28.5 GHz, 29.0 GHz, 29.5 GHz and 30 GHz, respectively. FIG. 5A to FIG. 5D are plots showing radiation patterns at port #3 at boresight with variation of liquid crystal dielectric constant in the XZ plane at 28.5 GHz, 29.0 GHz, 29.5 GHz and 30 GHz, respectively.

By tuning the dielectric constant of the liquid crystal, the grid array antenna (200) scans with a beam steering angle of from −13° to −35° at a fixed operating frequency of 29 GHz (port #1). The liquid crystal material is able to provide a beam steering range of about 22°. The realized gain is about 15 dBi with beam coverage of 36° and scanning gain loss is about 1.6 dB with electronically beam scanning based on tunable liquid crystal material.

Table 1 compares the antenna scanning range at 29 GHz (three excitation ports-based GAA structure) for the GAA (200) and conventional GAA structures.

TABLE 1

Beam direction of a conventional GAA and GAA (200) with respect to different liquid crystal dielectric constants

| Dielectric | Conventional GAA's beam direction (deg) | | | | | | Beam direction GAA (200) (deg) | | |
|---|---|---|---|---|---|---|---|---|---|
| constant | P1 | P3 | P2 | P1 | P3 | P2 | P1 | P3 | P2 |
| 2.4 | −26, 0 | 0, 0 | 26, 0 | | | | −26, 0 | 0, 0 | 26, 0 |
| 2.5 | | | | | | | −24, 0 | 0, 0 | 24, 0 |
| 2.6 | | | | | | | −23, 0 | 0, 0 | 23, 0 |
| 2.7 | | | | | | | −22, 0 | 0, 0 | 22, 0 |
| 2.8 | | | | | | | −21, 0 | 0, 0 | 21, 0 |
| 2.9 | | | | | | | −19, 0 | 0, 0 | 19, 0 |
| 3.0 | | | | | | | −17, 0 | 0, 0 | 17, 0 |
| 3.1 | | | | | | | −15, 0 | 0, 0 | 15, 0 |
| 3.2 | | | | | | | −13, 0 | 0, 0 | 13, 0 |
| 3.3 | | | | | | | −11, 0 | 0, 0 | 11, 0 |
| 3.4 | | | | −8, 0 | 0, 0 | 8, 0 | −8, 0 | 0, 0 | 8, 0 |

In the example embodiment, the grid array antenna (200) is capable of providing the necessary phase shift for generating beam scanning without physical phase shifters. In the example embodiment, the grid array antenna (200) is substantially devoid of a physical phase shifter, such as solid-state, MEMS or ferrite-based phase shifters. In the example embodiment, the grid array antenna (200) may be capable of creating a phase shift or delay at fixed excitation, based on liquid crystal dielectric constant variation which is dependent upon the applied biasing. Advantageously, beam steering coverage and resolution may be improved significantly based on the applied biasing voltage. In the example embodiment, the grid array antenna (200) may provide an electronic beam steering tunable material (e.g., liquid crystal) based planar GAA having a simplified configuration with relatively low profile, low cost, and low power consumption.

Figure 6:
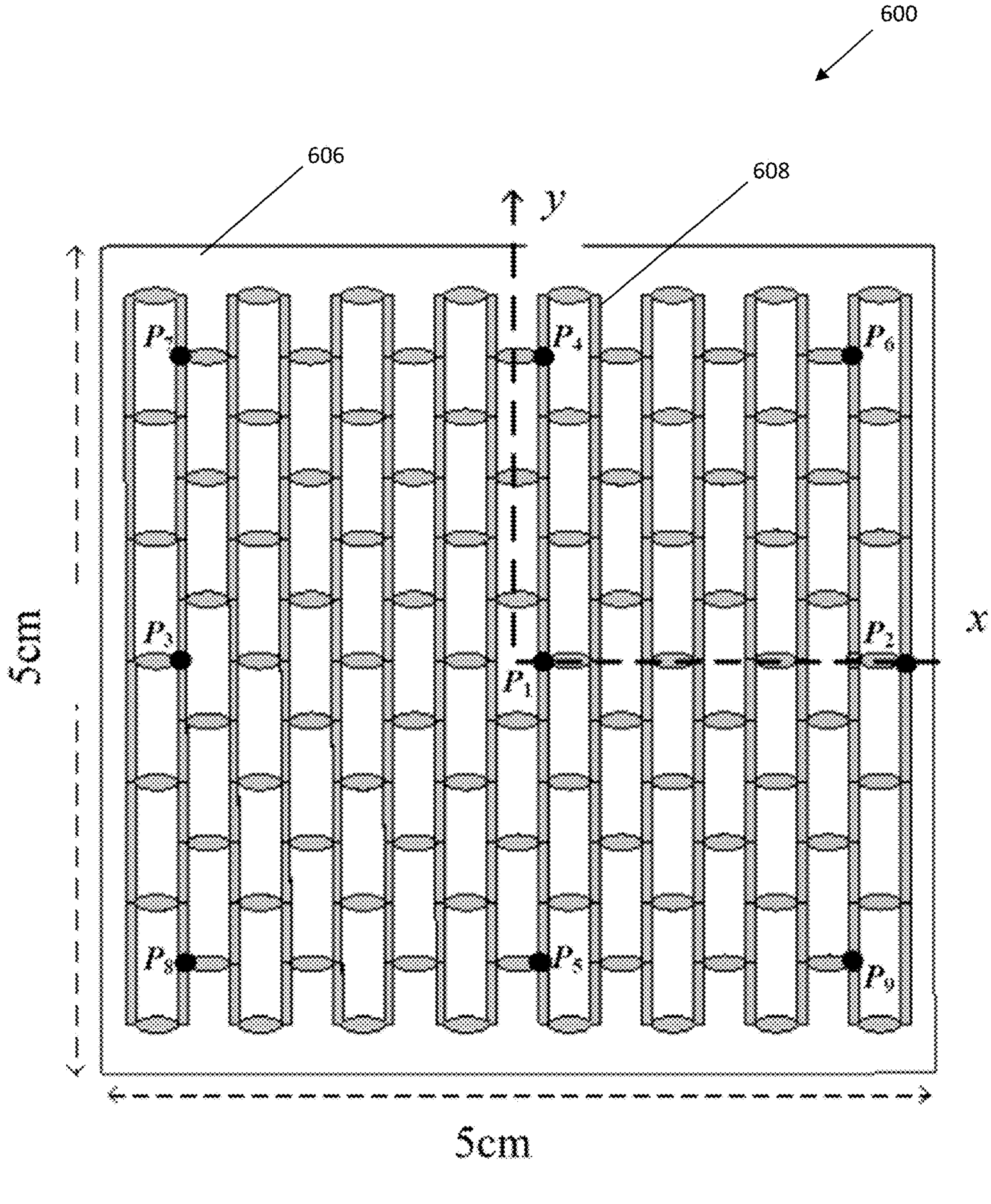
FIG. 6 is a schematic top view drawing of an antenna system, e.g., grid array antenna system in another example embodiment.

FIG. 6 is a schematic top view drawing of an antenna system, e.g., grid array antenna system (600) in another example embodiment. The grid array antenna system (600) comprises a radiator (608) disposed on a substrate (606), said radiator (608) comprising nine feeding points/ports (P1, P2, P3, P4, P5, P6, P7, P8, P9). The grid array antenna system (600) of FIG. 6 is substantially similar to the grid array antenna system (200) of FIG. 2A and FIG. 2B. Specifically, the grid array antenna system (600) of FIG. 6 also comprises a tunable material layer (compare 204 of FIG. 2A) having a tunable material capable of changing its dielectric constant in response to a variable biasing voltage (compare 218 of FIG. 2A) applied between the radiator (608) and the base member (compare 202 of FIG. 2A), such that one or more properties of the beam changes according to the dielectric constant of the tunable material. However, the grid array antenna system (600) of FIG. 6 differs at least in terms of its overall physical dimensions and the total number of feeding points.

As shown in FIG. 6, the feeding ports (P1-P9) are arranged in a lattice configuration having a first direction (i.e., parallel to the X-axis) and a second direction (i.e., parallel to the Y-axis), wherein the second direction is substantially perpendicular to the first direction. Each feeding port (e.g., P1) of the plurality of feeding ports (P1-P9) is configured to receive an excitation signal for generating the beam. The feeding ports (P1-P9) are arranged to be equally spaced apart along the first direction and second direction. As shown in FIG. 6, the nine feeding ports (P1-P9) are arranged in a 3×3 grid/lattice configuration.

In the example embodiment, the grid array antenna system (600) may further comprise a plurality of feed lines or feed connectors, e.g., coaxial connectors, for transmitting and receiving signals to and from the radiator (608). Each of the plurality of feeding points (P1, P2, P3, P4, P5, P6, P7, P8, P9) may be coupled to each of the plurality of feed lines or feed connectors. The first feeding point (P1) may be configured as the center feeding point for allowing the grid array antenna (600) to generate a boresight beam. The second feeding point (P2) and third feeding point (P3) may be configured to generate tilted beams directed to the positive X-axis direction and negative X-axis direction, respectively. Taken together, the ports P1 to P3 may be configured to generate beams with a specific coverage along the X-axis. Similarly, the fourth to ninth feeding points (P4-P9) may be configured to generate beams with a specific coverage along the X-axis, along the Y-axis direction or diagonally at an angle between the X and Y axes direction. The grid array antenna system (600) may be configured such that the application of the biasing voltage causes the beam to steer in a desired direction.

In the example embodiment, the grid antenna system (600) has a nine-port tunable material-based GAA structure for 3D beam scanning. The grid antenna system (600) has an antenna panel size of 50.0 mm by 50.0 mm. The substrate (606) is a GAA supporting substrate (Rogers RO4003, dielectric constant, $\varepsilon r=3.5$, loss tangent=0.0027) with a thickness of 0.254 mm. The grid antenna system (600) further comprises a switchable GAA structure with 3-D beam scanning with nine excitations being placed in different directions of the GAA structure.

Figure 7A:
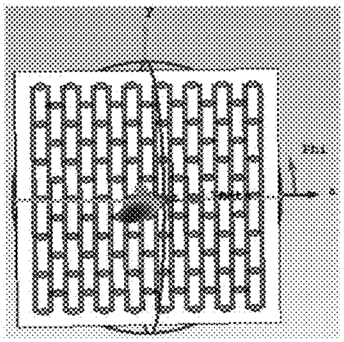
FIG. 7A is a first plot showing a simulated three-dimensional (3-D) radiation pattern generated by a nine-port grid array antenna in an example embodiment.
Figure 7B:
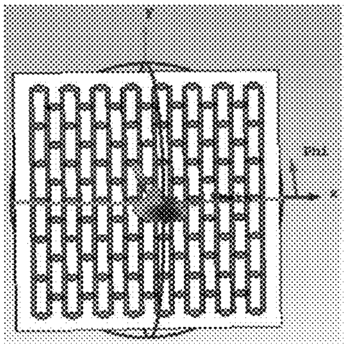
FIG. 7B is a second plot showing a simulated 3D radiation pattern generated by the nine-port grid array antenna in the example embodiment.
Figure 7C:
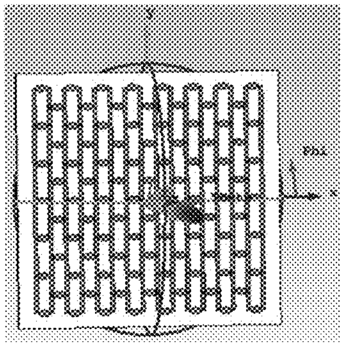
FIG. 7C is a third plot showing a simulated 3D radiation pattern generated by the nine-port grid array antenna in the example embodiment.
Figure 7D:
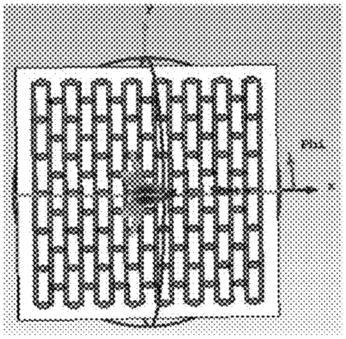
FIG. 7D is a fourth plot showing a simulated 3D radiation pattern generated by the nine-port grid array antenna in the example embodiment.
Figure 7E:
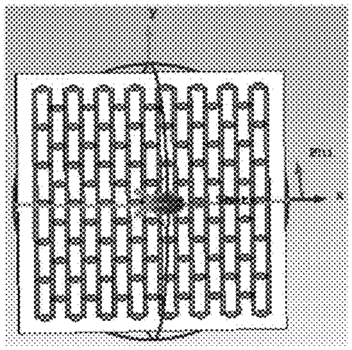
FIG. 7E is a fifth plot showing a simulated 3D radiation pattern generated by the nine-port grid array antenna in the example embodiment.
Figure 7F:
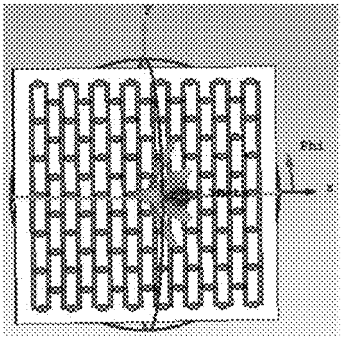
FIG. 7F is a sixth plot showing a simulated 3D radiation pattern generated by the nine-port grid array antenna in the example embodiment.
Figure 7G:
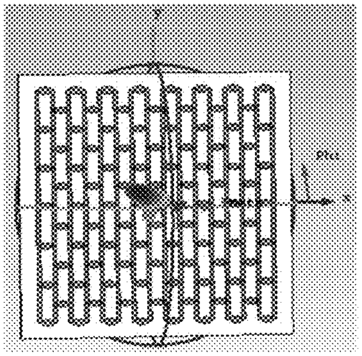
FIG. 7G is a seventh plot showing a simulated 3D radiation pattern generated by the nine-port grid array antenna in the example embodiment.
Figure 7H:
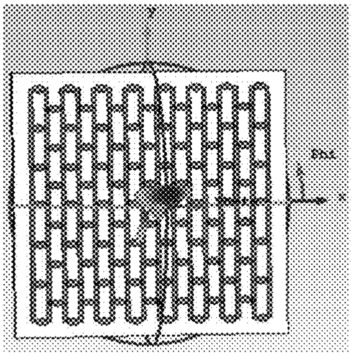
FIG. 7H is an eighth plot showing a simulated 3D radiation pattern generated by the nine-port grid array antenna in the example embodiment.
Figure 7I:
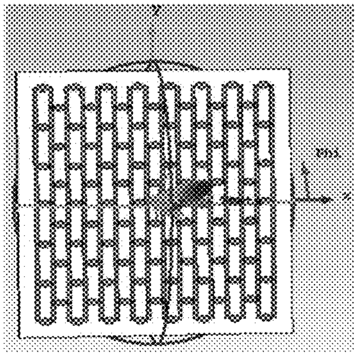
FIG. 7I is a ninth plot showing a simulated 3D radiation pattern generated by the nine-port grid array antenna in the example embodiment.

In the example embodiment, the 3-D radiation patterns for the nine port GAA structure at 29.0 GHz are shown in FIG. 7A to FIG. 7I. FIG. 7A to FIG. 7I are plots showing simulated three-dimensional (3-D) radiation patterns generated by the nine-port GAA system in an example embodiment when the liquid crystal is with dielectric constant of 3.5. When the nine ports are excited respectively, the GAA generates nine beams at different directions as shown in FIG. 7A ($\theta=-14°$, $\varphi=30°$), FIG. 7B ($\theta=-6°$, $\varphi=-90°$), FIG. 7C ($\theta=14°$, $\varphi=-30°$), FIG. 7D ($\theta=-8°$, $\varphi=0°$), FIG. 7E ($\theta=0°$, $\varphi=0°$), FIG. 7F ($\theta=8°$, $\varphi=0°$), FIG. 7G ($\theta=-14°$, $\varphi=-30°$), FIG. 7H ($\theta=6°$, $\varphi=90°$), and FIG. 7I ($\theta=14°$, $\varphi=30°$). By adjusting the DC bias voltage, the liquid crystal dielectric constant can be tuned and the directions of the nine beams can be changed accordingly.

Table 2 shows the beam steering angle variation when the tunable material (liquid crystal) dielectric constant changed from 2.4 to 3.4 at different ports of the GAA structure. θ represents an angle of the beam projected in the X-Z plane, measured with respect to the Z-axis, ϕ represents an angle of the beam projected in the X-Y plane, measured with respect to the X-axis.

TABLE 2

Beam scanning direction in θ and ϕ (degrees) at 29 GHz

| | $\varepsilon_r$ | |
|---|---|---|
| Ports | 3.4 Antenna beam direction (θ, ϕ) (deg) | 2.4 Antenna beam direction (θ, ϕ) (deg) |
| $P_1$ | 0, 0 | 0, 0 |
| $P_2$ | 8, 0 | 26, 0 |
| $P_3$ | −8, 0 | −26, 0 |
| $P_4$ | −6, 0 | −20, 0 |
| $P_5$ | 6, 0 | 20, 0 |
| $P_6$ | 14, −30 | 28, −3 |
| $P_7$ | −14, 30 | −28, 3 |
| $P_8$ | −14, −30 | −28, −3 |
| $P_9$ | 14, 30 | 28, 3 |

The example embodiment demonstrates that a tunable material (e.g., liquid crystal) based GAA can be used for 3-D beam scanning based on switched-beam technology with high resolution and enhanced coverage. This solution can be implemented in a beam scanning antenna system for millimeter-wave SatCom satellite, radar, and 5G system applications.

Figure 8:
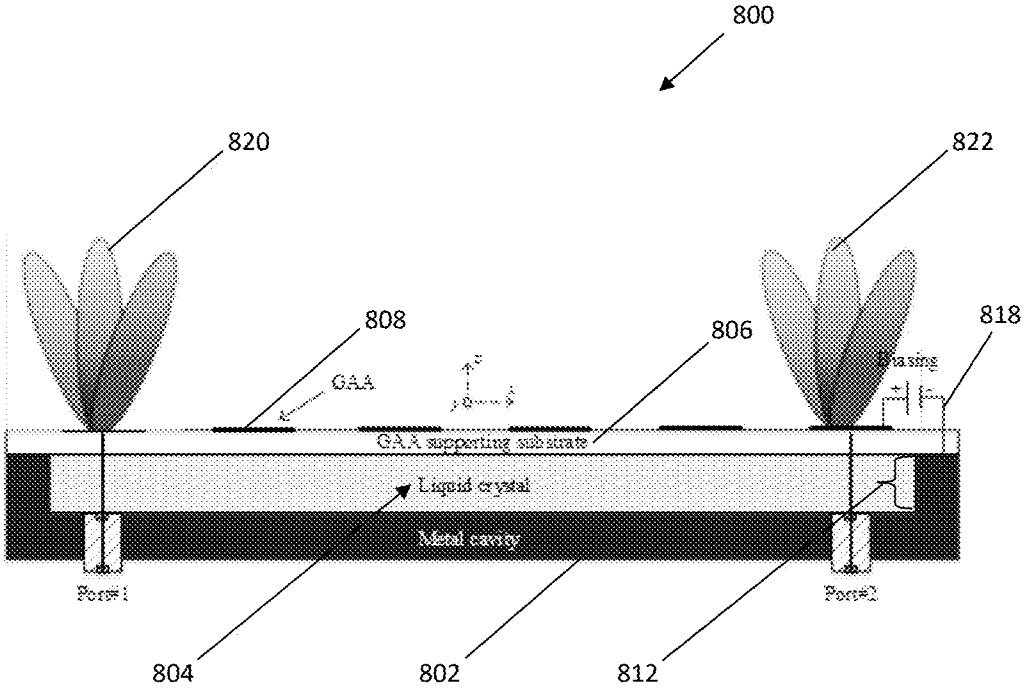
FIG. 8 is a schematic side view drawing of an antenna system, e.g., grid array antenna system in yet another example embodiment.

FIG. 8 is a schematic side view drawing of an antenna system, e.g., grid array antenna system (800) in yet another example embodiment. The grid array antenna system (800) comprises a base member (802) having a cavity/recessed portion (812) defined on a surface thereof, a tunable material layer (804) disposed within the cavity (812) of the base member (802), a substantially planar substrate (806) coupled to the base member (802) such that a first side of the substrate (806) is in contact with the tunable material layer (804), and a radiator (808) coupled to a second side of the substrate (806) such that the substrate (806) is between the radiator (808) and the base member (802), said radiator (808) comprising an array of grid cells configured to generate a beam upon excitation thereof. In the example embodiment, the tunable material layer (804) comprises a tunable material (e.g., liquid crystal) capable of changing its dielectric constant in response to a variable biasing voltage, e.g., DC voltage (818) applied between the radiator (808) and the base member (802), such that one or more properties of the beam changes according to the dielectric constant of the tunable material.

The radiator (808) further comprises a plurality of feeding points/ports. As shown in FIG. 8, the radiator (808) comprises two feeding ports, namely, a first feeding port (P1) and a second feeding port (P2). The base member (802) comprises a plurality of apertures/holes/openings for facilitating electrical connection between the radiator (808) and a signal source (not shown). Each feeding port (e.g., P1) of the plurality of feeding port is configured to receive an excitation signal for generating the beam. As shown in FIG. 8, a first beam (820) is generated from the radiator (808) at a position corresponding to the first feeding port (P1) and a second beam (822) is generated from the radiator (808) at a position corresponding to the second feeding port (P2).

While conventional GAA has a fixed beam structure, the grid array antenna system (800) may be configured to generate a scan beam at a fixed port, so that scan resolution and scanning coverage can be enhanced as shown in FIG. 8. With fine control of the DC biasing, a high beam resolution can be achieved by the antenna system (800) without any active phase shifter or digital beamformer. The dielectric constant of the liquid crystal can be varied very precisely with fine-tuning of applied DC biasing over the liquid crystal cavity such that a high beam resolution can be generated. The antenna system (800) may advantageously overcome the limitation of conventional GAA with comparatively higher beam resolution and wider beam coverage. The antenna system (800) can also solve the issues of cost, complexity, and power consumption of conventional digital beamforming or phased array-based antenna systems.

Figure 9:
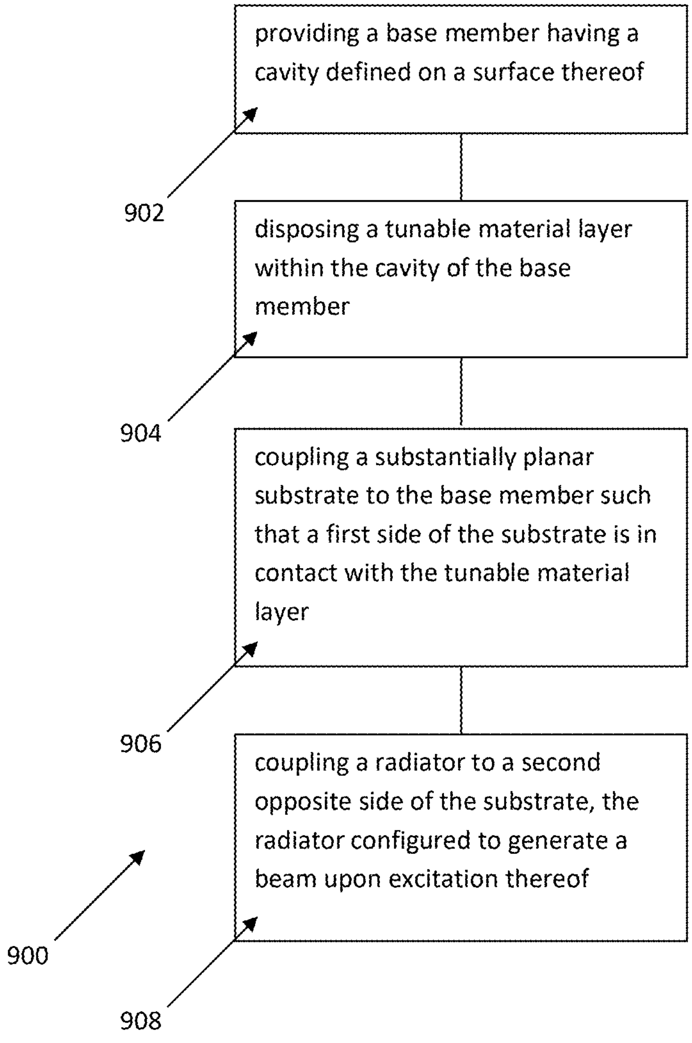
FIG. 9 is a schematic flowchart for illustrating a method of forming an antenna system in an example embodiment.

FIG. 9 is a schematic flowchart (900) for illustrating a method of forming an antenna system in an example embodiment. At step 902, a base member having a cavity defined on a surface thereof is provided. At step 904, a tunable material layer is disposed within the cavity of the base member. At step 906, a substantially planar substrate is coupled to the base member such that a first side of the substrate is in contact with the tunable material layer. At step 908, a radiator is coupled to a second side of the substrate such that the substrate is between the radiator and the base member, the radiator configured to generate a beam upon excitation thereof. In the example embodiment, the tunable material layer comprises a tunable material capable of changing its dielectric constant in response to a variable biasing voltage applied between the radiator and the base member, such that one or more properties of the beam changes according to the dielectric constant of the tunable material.

In the example embodiment, the method may further comprise providing a plurality of feeding points to the radiator, wherein each feeding point of the plurality of feeding points is configured to receive an excitation signal for generating the beam. The method may further comprise arranging the plurality of feeding points to be equally spaced apart along a first direction which is parallel to the substrate. The method may further comprise arranging the plurality of feeding points in a lattice configuration having a first direction and a second direction, wherein the second direction is substantially perpendicular to the first direction. The method may further comprise providing a processing module for providing the biasing voltage. The grid array antenna may be substantially devoid of a phase shifter. The base member may be made of metal and the tunable material layer may be a liquid crystal layer.

Figure 10:
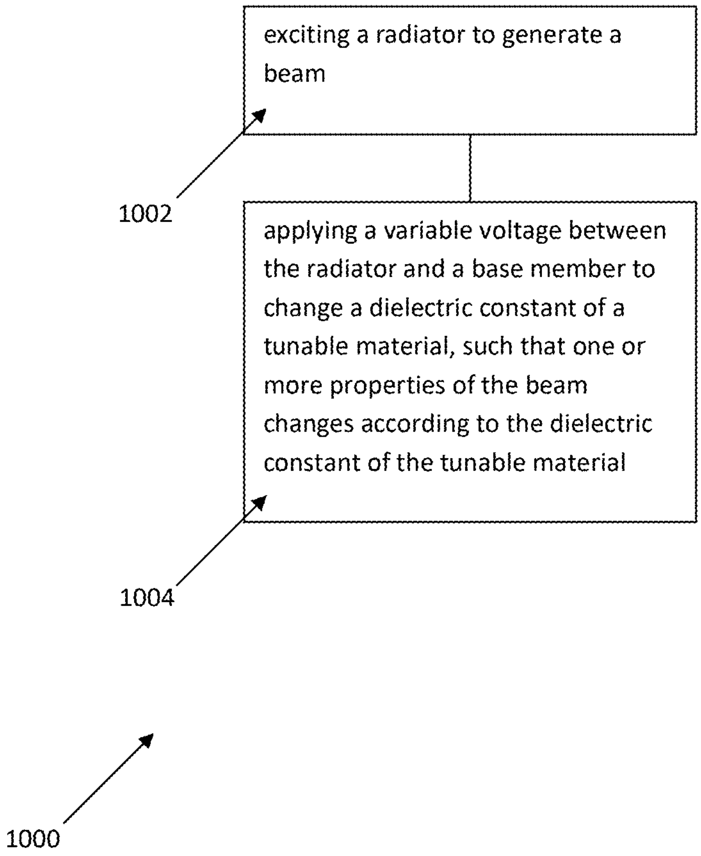
FIG. 10 is a schematic flowchart for illustrating a method of operating an antenna system in an example embodiment.

FIG. 10 is a schematic flowchart (1000) for illustrating a method of operating an antenna system in an example embodiment. The antenna system comprises a base member having a cavity defined on a surface thereof; a tunable material layer disposed within the cavity of the base member, said tunable material layer comprising a tunable material capable of changing its dielectric constant in response to a variable biasing voltage; a substantially planar substrate coupled to the base member such that a first side of the substrate is in contact with the tunable material layer; and a radiator comprising an array of grid cells coupled to a second side of the substrate such that the substrate is between the radiator and the base member. At step 1002, the radiator is excited to generate a beam. At step 1004, a variable biasing voltage is applied between the radiator and the base member to change the dielectric constant of the tunable material, such that one or more properties of the beam changes according to the dielectric constant of the tunable material.

In the example embodiment, the method may further comprise varying the dielectric constant of the tunable material from about 2.4 to about 3.4 in response to the biasing voltage. The method may further comprise varying the biasing voltage from about 0 V to about 20 V. The one or more properties of the beam may comprise a steering angle of the beam and a steering resolution of the beam. The steering angle of the beam may range from about −28° to about 28° with respect to a vertical axis which is perpendicular to the substantially planar substrate.

In the described example embodiments, an antenna system for generating a 3-D beam is proposed. The antenna system comprises a substrate, a radiator disposed on the substrate, the radiator comprising a plurality of grid cells arranged in a grid array, a plurality of ports (e.g., 3, 6, or 9 ports) disposed at predefined locations on the radiator, wherein each of the plurality of ports is configured to generate excitation in a plurality of directions of the grid array. The antenna system further comprises a tunable material (e.g., liquid crystal) layer coupled to the substrate, a metal cavity coupled to the tunable material such that the tunable material is sandwiched between the substrate and the metal cavity.

In the described example embodiments, the antenna system e.g., tunable material-based grid array antenna system may advantageously provide enhanced beam steering coverage and scan resolution. The antenna system may not utilize physical phase shifters. The antenna system may be configured to operate in the Ka frequency band. The antenna system may advantageously provide a relatively low cost but enhanced beam steering coverage antenna of from about −20° to about 20°, offer a resolution of less than about 1° (as compared to a scanning resolution of about 13° for a conventional GAA), with a low scan loss of less than about 1.6 dB, relatively low power consumption, low cost, and simple configuration. Accordingly, the antenna system as disclosed herein may address limitations of conventional GAAs, such as limited scanning coverage, limited scanning resolution, beam shape/side lobe level issues, cost, complexity, and power consumption of conventional digital beamforming or phased array-based antenna systems.

In the described example embodiments, the antenna system may be applied in various applications such as airborne objects, satellites, radar, 5G communications, drones and unmanned aerial vehicles.

The terms "coupled" or "connected" as used in this description are intended to cover both directly connected or connected through one or more intermediate means, unless otherwise stated.

The description herein may be, in certain portions, explicitly or implicitly described as algorithms and/or functional operations that operate on data within a computer memory or an electronic circuit. These algorithmic descriptions and/or functional operations are usually used by those skilled in the information/data processing arts for efficient description. An algorithm is generally relating to a self-consistent sequence of steps leading to a desired result. The algorithmic steps can include physical manipulations of physical quantities, such as electrical, magnetic, or optical signals capable of being stored, transmitted, transferred, combined, compared, and otherwise manipulated.

Further, unless specifically stated otherwise, and would ordinarily be apparent from the following, a person skilled in the art will appreciate that throughout the present specification, discussions utilizing terms such as "scanning", "calculating", "determining", "replacing", "generating", "initializing", "outputting", and the like, refer to action and processes of an instructing processor/computer system, or similar electronic circuit/device/component, that manipulates/processes and transforms data represented as physical quantities within the described system into other data similarly represented as physical quantities within the system or other information storage, transmission or display devices etc.

The description also discloses relevant device/apparatus for performing the steps of the described methods. Such apparatus may be specifically constructed for the purposes of the methods or may comprise a general purpose computer/processor or other device selectively activated or reconfigured by a computer program stored in a storage member. The algorithms and displays described herein are not inherently related to any particular computer or other apparatus. It is understood that general purpose devices/machines may be used in accordance with the teachings herein. Alternatively, the construction of a specialized device/apparatus to perform the method steps may be desired.

In addition, it is submitted that the description also implicitly covers a computer program, in that it would be clear that the steps of the methods described herein may be put into effect by computer code. It will be appreciated that a large variety of programming languages and coding can be used to implement the teachings of the description herein. Moreover, the computer program if applicable is not limited to any particular control flow and can use different control flows without departing from the scope of the invention.

Furthermore, one or more of the steps of the computer program if applicable may be performed in parallel and/or sequentially. Such a computer program if applicable may be stored on any computer readable medium. The computer readable medium may include storage devices such as magnetic or optical disks, memory chips, or other storage devices suitable for interfacing with a suitable reader/general purpose computer. In such instances, the computer readable storage medium is non-transitory. Such storage medium also covers all computer-readable media e.g., medium that stores data only for short periods of time and/or only in the presence of power, such as register memory, processor cache and Random Access Memory (RAM) and the like. The computer readable medium may even include a wired medium such as exemplified in the Internet system, or wireless medium such as exemplified in Bluetooth technology. The computer program when loaded and executed on a suitable reader effectively results in an apparatus that can implement the steps of the described methods.

The example embodiments may also be implemented as hardware modules. A module is a functional hardware unit designed for use with other components or modules. For example, a module may be implemented using digital or discrete electronic components, or it can form a portion of an entire electronic circuit such as an Application Specific Integrated Circuit (ASIC). A person skilled in the art will understand that the example embodiments can also be implemented as a combination of hardware and software modules.

Additionally, when describing some embodiments, the disclosure may have disclosed a method and/or process as a particular sequence of steps. However, unless otherwise required, it will be appreciated the method or process should not be limited to the particular sequence of steps disclosed. Other sequences of steps may be possible. The particular order of the steps disclosed herein should not be construed as undue limitations. Unless otherwise required, a method and/or process disclosed herein should not be limited to the steps being carried out in the order written. The sequence of steps may be varied and still remain within the scope of the disclosure.

Further, in the description herein, the word “substantially” whenever used is understood to include, but not restricted to, “entirely” or “completely” and the like. In addition, terms such as “comprising”, “comprise”, and the like whenever used, are intended to be non-restricting descriptive language in that they broadly include elements/components recited after such terms, in addition to other components not explicitly recited. For an example, when “comprising” is used, reference to a “one” feature is also intended to be a reference to “at least one” of that feature. Terms such as “consisting”, “consist”, and the like, may, in the appropriate context, be considered as a subset of terms such as “comprising”, “comprise”, and the like. Therefore, in embodiments disclosed herein using the terms such as “comprising”, “comprise”, and the like, it will be appreciated that these embodiments provide teaching for corresponding embodiments using terms such as “consisting”, “consist”, and the like. Further, terms such as “about”, “approximately” and the like whenever used, typically means a reasonable variation, for example a variation of +/−5% of the disclosed value, or a variance of 4% of the disclosed value, or a variance of 3% of the disclosed value, a variance of 2% of the disclosed value or a variance of 1% of the disclosed value.

Furthermore, in the description herein, certain values may be disclosed in a range. The values showing the end points of a range are intended to illustrate a preferred range. Whenever a range has been described, it is intended that the range covers and teaches all possible sub-ranges as well as individual numerical values within that range. That is, the end points of a range should not be interpreted as inflexible limitations. For example, a description of a range of 1% to 5% is intended to have specifically disclosed sub-ranges 1% to 2%, 1% to 3%, 1% to 4%, 2% to 3% etc., as well as individually, values within that range such as 1%, 2%, 3%, 4% and 5%. The intention of the above specific disclosure is applicable to any depth/breadth of a range.

Figure 11:
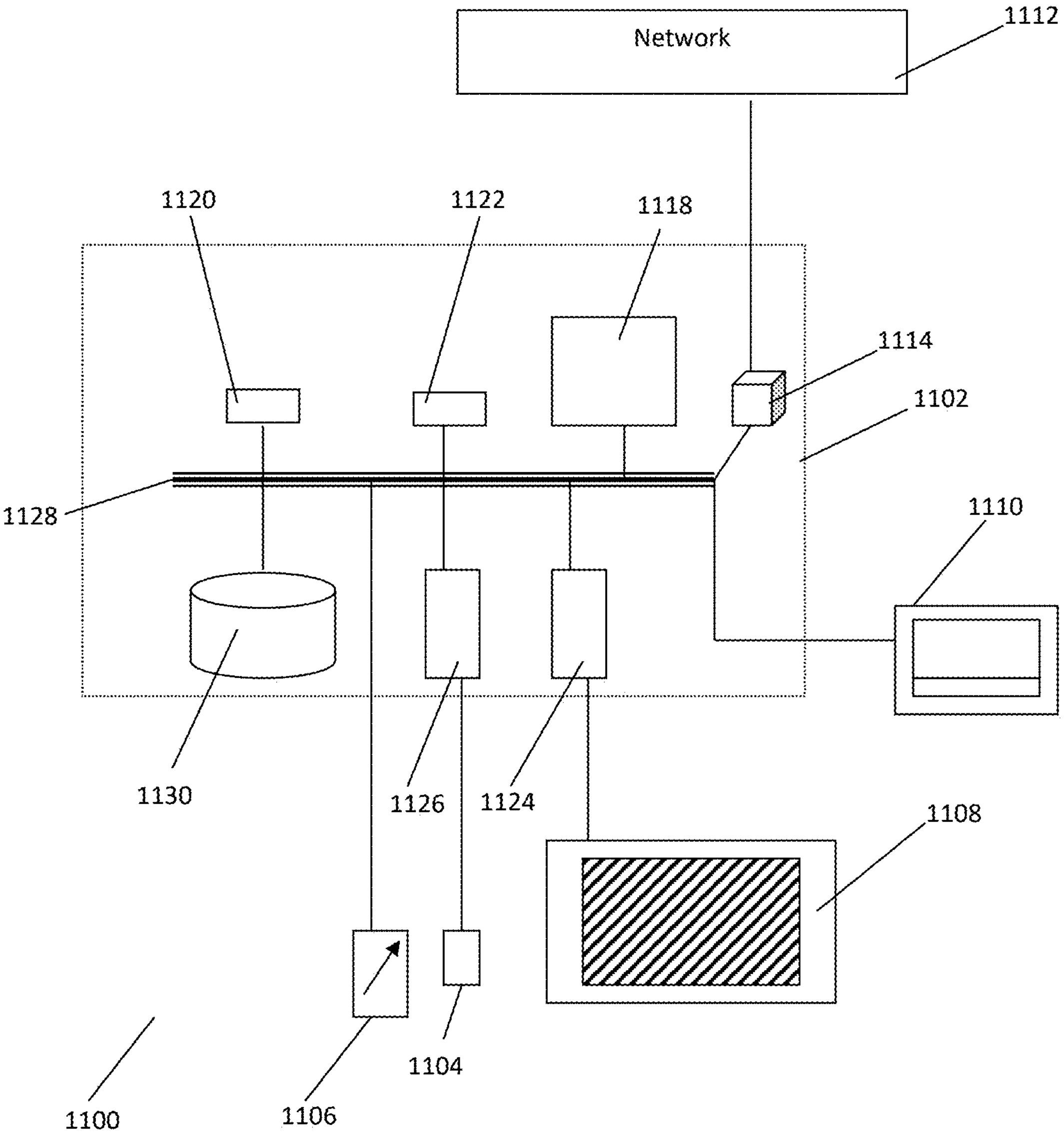
FIG. 11 is a schematic drawing of a computer system suitable for implementing an example embodiment.

FIG. 11 is a schematic drawing of a computer system suitable for implementing an example embodiment. Different example embodiments can be implemented in the context of data structure, program modules, program and computer instructions executed in a computer implemented environment. A general purpose computing environment is briefly disclosed herein. One or more example embodiments may be embodied in one or more computer systems, such as is schematically illustrated in FIG. 11.

One or more example embodiments may be implemented as software, such as a computer program being executed within a computer system 1100, and instructing the computer system 1100 to conduct a method of an example embodiment.

The computer system 1100 comprises a computer unit 1102, input modules such as a keyboard 1104 and a pointing device 1106 and a plurality of output devices such as a display 1108, and printer 1110. A user can interact with the computer unit 1102 using the above devices. The pointing device can be implemented with a mouse, track ball, pen device or any similar device. One or more other input devices (not shown) such as a joystick, game pad, satellite dish, scanner, touch sensitive screen or the like can also be connected to the computer unit 1102. The display 1108 may include a cathode ray tube (CRT), liquid crystal display (LCD), field emission display (FED), plasma display or any other device that produces an image that is viewable by the user.

The computer unit 1102 can be connected to a computer network 1112 via a suitable transceiver device 1114, to enable access to e.g. the Internet or other network systems such as Local Area Network (LAN) or Wide Area Network (WAN) or a personal network. The network 1112 can comprise a server, a router, a network personal computer, a peer device or other common network node, a wireless telephone or wireless personal digital assistant. Networking environments may be found in offices, enterprise-wide computer networks and home computer systems etc. The transceiver device 1114 can be a modem/router unit located within or external to the computer unit 1102, and may be any type of modem/router such as a cable modem or a satellite modem.

It will be appreciated that network connections shown are exemplary and other ways of establishing a communications link between computers can be used. The existence of any of various protocols, such as TCP/IP, Frame Relay, Ethernet, FTP, HTTP and the like, is presumed, and the computer unit 1102 can be operated in a client-server configuration to permit a user to retrieve web pages from a web-based server. Furthermore, any of various web browsers can be used to display and manipulate data on web pages.

The computer unit 1102 in the example comprises a processor 1118, a Random Access Memory (RAM) 1120 and a Read Only Memory (ROM) 1122. The ROM 1122 can be a system memory storing basic input/output system (BIOS) information. The RAM 1120 can store one or more program modules such as operating systems, application programs and program data.

The computer unit 1102 further comprises a number of Input/Output (I/O) interface units, for example I/O interface unit 1124 to the display 1108, and I/O interface unit 1126 to the keyboard 1104. The components of the computer unit 1102 typically communicate and interface/couple connectedly via an interconnected system bus 1128 and in a manner known to the person skilled in the relevant art. The bus 1128 can be any of several types of bus structures including a memory bus or memory controller, a peripheral bus, and a local bus using any of a variety of bus architectures.

It will be appreciated that other devices can also be connected to the system bus 1128. For example, a universal serial bus (USB) interface can be used for coupling a video or digital camera to the system bus 1128. An IEEE 1394 interface may be used to couple additional devices to the computer unit 1102. Other manufacturer interfaces are also possible such as FireWire developed by Apple Computer and i.Link developed by Sony. Coupling of devices to the system bus 1128 can also be via a parallel port, a game port, a PCI board or any other interface used to couple an input device to a computer. It will also be appreciated that, while the components are not shown in the figure, sound/audio can be recorded and reproduced with a microphone and a speaker. A sound card may be used to couple a microphone and a speaker to the system bus 1128. It will be appreciated that several peripheral devices can be coupled to the system bus 1128 via alternative interfaces simultaneously.

An application program can be supplied to the user of the computer system 1100 being encoded/stored on a data storage medium such as a CD-ROM or flash memory carrier. The application program can be read using a corresponding data storage medium drive of a data storage device 1130. The data storage medium is not limited to being portable and can include instances of being embedded in the computer unit 1102. The data storage device 1130 can comprise a hard disk interface unit and/or a removable memory interface unit (both not shown in detail) respectively coupling a hard disk drive and/or a removable memory drive to the system bus 1128. This can enable reading/writing of data. Examples of removable memory drives include magnetic disk drives and optical disk drives. The drives and their associated computer-readable media, such as a floppy disk provide non-volatile storage of computer readable instructions, data structures, program modules and other data for the computer unit 1102. It will be appreciated that the computer unit 1102 may include several of such drives. Furthermore, the computer unit 1102 may include drives for interfacing with other types of computer readable media.

The application program is read and controlled in its execution by the processor 1118. Intermediate storage of program data may be accomplished using RAM 1120. The method(s) of the example embodiments can be implemented as computer readable instructions, computer executable components, or software modules. One or more software modules may alternatively be used. These can include an executable program, a data link library, a configuration file, a database, a graphical image, a binary data file, a text data file, an object file, a source code file, or the like. When one or more computer processors execute one or more of the software modules, the software modules interact to cause one or more computer systems to perform according to the teachings herein.

The operation of the computer unit 1102 can be controlled by a variety of different program modules. Examples of program modules are routines, programs, objects, components, data structures, libraries, etc. that perform particular tasks or implement particular abstract data types. The example embodiments may also be practiced with other computer system configurations, including handheld devices, multiprocessor systems, microprocessor-based or programmable consumer electronics, network PCs, minicomputers, mainframe computers, personal digital assistants, mobile telephones and the like. Furthermore, the example embodiments may also be practiced in distributed computing environments where tasks are performed by remote processing devices that are linked through a wireless or wired communications network. In a distributed computing environment, program modules may be located in both local and remote memory storage devices.

The example embodiments may also be practiced with other computer system configurations, including handheld devices, multiprocessor systems/servers, microprocessor-based or programmable consumer electronics, network PCs, minicomputers, mainframe computers, personal digital assistants, mobile telephones and the like. Furthermore, the example embodiments may also be practiced in distributed computing environments where tasks are performed by remote processing devices that are linked through a wireless or wired communications network. In a distributed computing environment, program modules may be located in both local and remote memory storage devices.

In the example embodiments, the antenna system is described as having dimensions of e.g., 50 mm length by 18 mm width, or 50 mm length by 50 mm width. However, it will be appreciated that the dimensions of the antenna system are not limited as such and may vary depending on factors such as gain, operating frequency, etc. The antenna system dimensions are directly related to the operating frequency, the size of each grid cell may be around $\lambda \times \lambda/2$, where $\lambda$ is a guided wavelength at the operating frequency.

In the example embodiments, the tunable material layer is described as comprising a liquid crystal layer. However, it will be appreciated that the tunable material layer is not limited as such and may comprise other types of tunable material, as long as one or more properties of the tunable material may be manipulated by external forces, for example, temperature, magnetism, or electricity, and as long as the manipulation of the one or more properties of the tunable material is capable of changing one or more properties of the beam generated by the antenna system.

In the example embodiments, the radiator is described as comprising 2, 3 or 9 feeding points. However, it will be appreciated that the antenna system is not limited as such and may be configured to comprise other numbers of feeding points. The feeding points may be arranged in a one-dimensional manner, e.g., equally spaced apart along the X-axis, or may be arranged in a two-dimensional manner, e.g., in a lattice configuration having a first direction and a second direction, wherein the second direction is substantially perpendicular to the first direction.

It will be appreciated by a person skilled in the art that other variations and/or modifications may be made to the specific embodiments without departing from the scope of the invention as broadly described. For example, in the description herein, features of different exemplary embodiments may be mixed, combined, interchanged, incorporated, adopted, modified, included etc. or the like across different exemplary embodiments. The present embodiments are, therefore, to be considered in all respects to be illustrative and not restrictive.

The invention claimed is:

1. An antenna system comprising, a base member having a cavity defined on a surface thereof;

a tunable material layer disposed within the cavity of the base member;

a substantially planar substrate coupled to the base member such that a first side of the substrate is in contact with the tunable material layer; and a radiator coupled to a second side of the substrate such that the substrate is between the radiator and the base member, said radiator comprising an array of grid cells configured to generate a beam upon excitation thereof, wherein adjacent grid cells are staggered, and each grid cell comprising 2 short sides, each comprising a radiating element, and 2 long sides, each comprising a shared feeding element;

wherein the tunable material layer comprises a tunable material capable of changing its dielectric constant in response to a variable biasing voltage applied between the radiator and the base member, such that one or more properties of the beam changes according to the dielectric constant of the tunable material.

2. The antenna system according to claim 1, wherein the radiator further comprises a plurality of feeding points, wherein each feeding point of the plurality of feeding points is configured to receive an excitation signal for generating the beam.

3. The antenna system according to claim 2, wherein the plurality of feeding points are arranged to be equally spaced apart along a first direction which is parallel to the substrate.

4. The antenna system according to claim 2, wherein the plurality of feeding points are arranged in a lattice configuration having a first direction and a second direction, wherein the second direction is substantially perpendicular to the first direction.

5. The antenna system according to claim 1, wherein the base member is made of metal and the tunable material layer is a liquid crystal layer.

6. The antenna system according to claim 1, further comprising a processing module configured to provide the biasing voltage.

7. The antenna system according to claim 1, wherein the dielectric constant of the tunable material is configured to vary from 2.4 to 3.4 in response to the biasing voltage.

8. The antenna system according to claim 1, wherein the biasing voltage is configured to vary from 0 V to 20 V.

9. The antenna system according to claim 1, wherein the cavity has a depth falling in the range of from 0.2 mm to 0.5 mm at the Ka-band.

10. The antenna system according to claim 1, wherein the one or more properties of the beam comprises a steering angle of the beam and a steering resolution of the beam.

11. The antenna system according to claim 10, wherein the steering angle of the beam is configured to range from −28° to 28° with respect to a vertical axis which is perpendicular to the substantially planar substrate.

12. The antenna system according to claim 1, wherein the antenna system is substantially devoid of a phase shifter.

13. A method of forming an antenna system, the method comprising, providing a base member having a cavity defined on a surface thereof;

disposing a tunable material layer within the cavity of the base member;

coupling a substantially planar substrate to the base member such that a first side of the substrate is in contact with the tunable material layer; and coupling a radiator to a second side of the substrate such that the substrate is between the radiator and the base member, the radiator configured to generate a beam upon excitation thereof, said radiator comprising an array of grid cells, wherein adjacent grid cells are staggered, and each grid cell comprising 2 short sides, each comprising a radiating element, and 2 long sides, each comprising a shared feeding element;

wherein the tunable material layer comprises a tunable material capable of changing its dielectric constant in response to a variable biasing voltage applied between the radiator and the base member, such that one or more properties of the beam changes according to the dielectric constant of the tunable material.

14. The method according to claim 13, further comprising providing a plurality of feeding points to the radiator, wherein each feeding point of the plurality of feeding points is configured to receive an excitation signal for generating the beam.

15. The method according to claim 14, further comprising arranging the plurality of feeding points to be equally spaced apart along a first direction which is parallel to the substrate.

16. The method according to claim 14, further comprising arranging the plurality of feeding points in a lattice configuration having a first direction and a second direction, wherein the second direction is substantially perpendicular to the first direction.

17. The method according to claim 13, wherein the base member is made of metal and the tunable material layer is a liquid crystal layer.

18. The method according to claim 13, further comprising providing a processing module configured to provide the biasing voltage.

19. The method according to claim 13, wherein the antenna system is substantially devoid of a phase shifter.

20. A method of operating an antenna system comprising, a base member having a cavity defined on a surface thereof;

a tunable material layer disposed within the cavity of the base member, said tunable material layer comprising a tunable material capable of changing its dielectric constant in response to a variable biasing voltage;

a substantially planar substrate coupled to the base member such that a first side of the substrate is in contact with the tunable material layer; and a radiator comprising an array of grid cells coupled to a second side of the substrate such that the substrate is between the radiator and the base member, wherein adjacent grid cells are staggered, and each grid cell comprising 2 short sides, each comprising a radiating element, and 2 long sides, each comprising a shared feeding element;

wherein the method comprises exciting the radiator to generate a beam; and applying a variable biasing voltage between the radiator and the base member to change the dielectric constant of the tunable material, such that one or more properties of the beam changes according to the dielectric constant of the tunable material.

* * * * *